US006969458B1

(12) United States Patent
McKenzie

(10) Patent No.: US 6,969,458 B1
(45) Date of Patent: Nov. 29, 2005

(54) FILTER

(75) Inventor: Darrell T. McKenzie, Gastonia, NC (US)

(73) Assignee: Wix Filtration Corp., Gastonia, NC (US)

( * ) Notice: Subject to any disclaimer, the term of this patent is extended or adjusted under 35 U.S.C. 154(b) by 71 days.

(21) Appl. No.: 10/624,494

(22) Filed: Jul. 23, 2003

(51) Int. Cl.[7] .......... B01D 35/30

(52) U.S. Cl. .......... 210/95; 210/443; 210/450; 210/454; 210/541; 210/DIG. 17; 220/600; 220/628

(58) Field of Search .......... 210/440, 443, 210/444, 450, DIG. 17, 95, 454, 541; 220/600, 220/628; 277/918

(56) References Cited

U.S. PATENT DOCUMENTS 4,021,342 A 5/1977 Schacht et al.
4,992,166 A 2/1991 Lowsky et al.
5,171,430 A 12/1992 Beach et al.
5,236,579 A 8/1993 Janik et al.
5,301,958 A * 4/1994 Covington .......... 277/641
5,690,814 A 11/1997 Holt
5,948,248 A 9/1999 Brown
2004/0007520 A1 * 1/2004 Rosendahl et al. .......... 210/435

* cited by examiner

*Primary Examiner*—Joseph Drodge
(74) *Attorney, Agent, or Firm*—Berenato, White & Stavish

(57) ABSTRACT

A filter having a thin metal flanged embedded within an open wall portion of a transparent plastic housing. The metal flange is permanently and non-detachably embedded within the wall and connected to a filter cover plate to create a fluid-tight seal. The resulting transparent spin-on filter allows a user to visually inspect the condition of the circulating fluid and filter without removing the filter from an operating system.

26 Claims, 3 Drawing Sheets

FILTER

BACKGROUND OF THE INVENTION

1. Field of the Invention

The invention generally relates to filters and more particularly to fluid filters.

2. Description of the Background Art

A typical spin-on filter has a painted metal outer housing with a threaded nipple centered in the base of the filter. In operation, pressurized fluid flows into the filter through multiple radially spaced apertures at the base of the filter. The fluid then flows through the filter media and into a center tube, and is then circulated out of the filter through the threaded nipple and back to the engine or host connecting apparatus.

The prior art also includes filter designs with plastic housings, and at least one filter design with a transparent plastic housing. However, these filters are difficult to manufacture and have significant structural and reliability issues associated with the filter's crimped plastic-to-metal interface.

SUMMARY OF THE INVENTION

The invention comprises a spin-on filter with a transparent plastic housing. The transparent plastic housing is integrally formed with a thin metal flange such that the flange is permanently embedded into the transparent plastic housing. The metal flange is then connected to the cover plate of the filter assembly to form a fluid-tight seal. The invention allows a user to visually inspect the condition of the fluid and filter without removing the filter from an operating system.

DETAILED DESCRIPTION OF A PREFERRED EMBODIMENT

Figure 1:
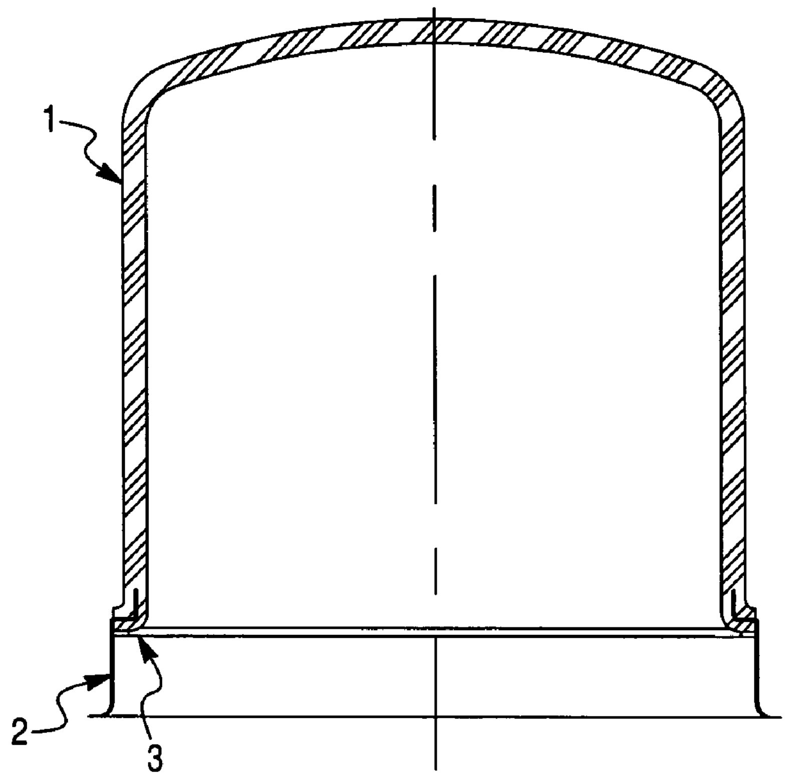
FIG. 1 is a sectional side view of the filter housing prior to assembly with other filter components.

FIG. 1 discloses a sectional side view of a filter housing assembly (4). The assembly (4) is comprised of a filter housing (1) formed around a thin metal flange (2). A compressible seal (3) may also be formed during the housing's manufacture. In the preferred embodiment, the filter housing (1) and compressible seal (3) are comprised of transparent plastic, and formed by an injection molding process. During the injection molding process, a thin malleable steel flange (2) is permanently and non-detachably embedded in the wall of the plastic filter housing (1) adjacent to the housing's open end.

Alternatively, the housing (1) and compressible seal (3) may be comprised of plastic or non-plastic, transparent or non-transparent materials. The compressible seal (3) may also be manufactured separately from a different material than the housing (1), and added to the assembly (4) later. A process other than injection molding may be used to manufacture the plastic components. Although the filter housing (1) and flange (2) may be thicker or thinner depending on a specific application, a typical filter housing may be 0.080 inches thick, and the flange may be 0.0149 inches thick.

Figure 2:
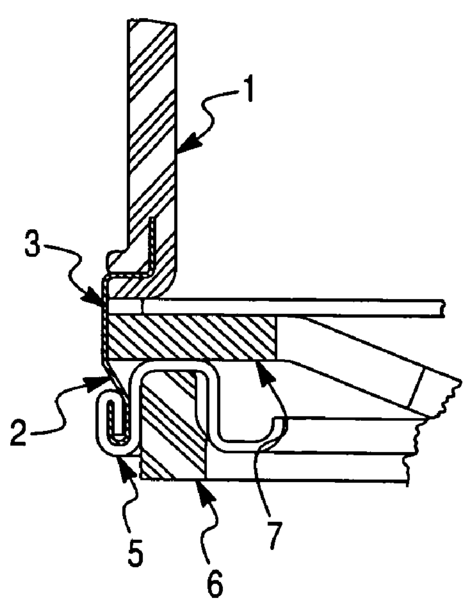
FIG. 2 is an expanded sectional view of the seal mechanism.
Figure 3:
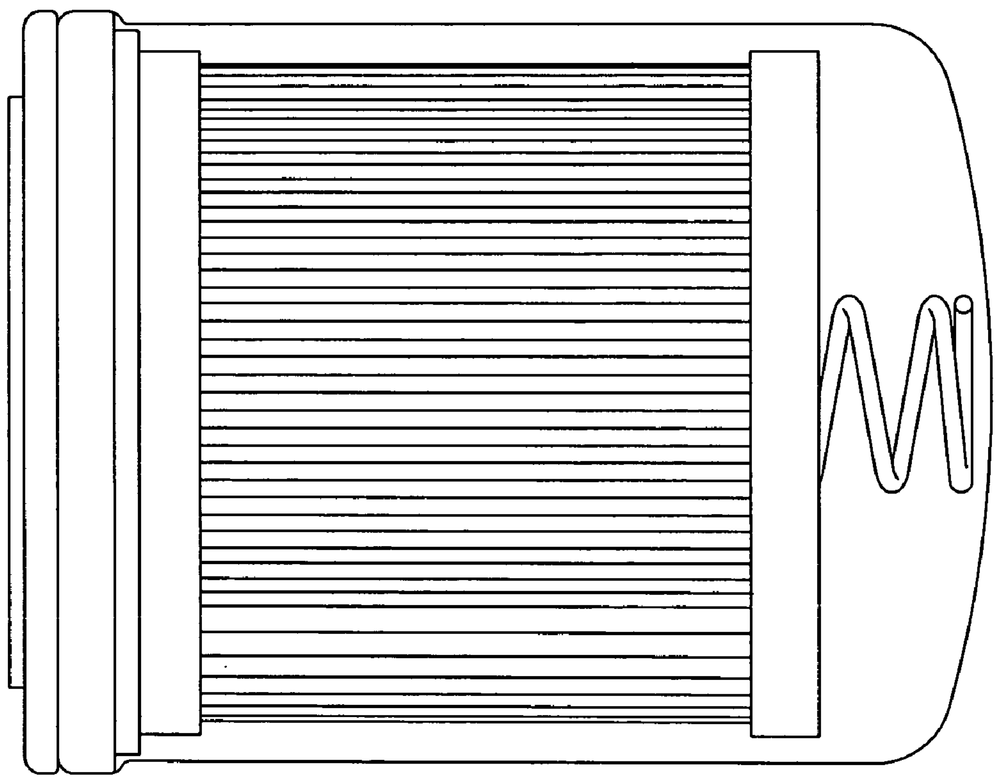
FIG. 3 is a side view of the assembled filter.
Figure 4:
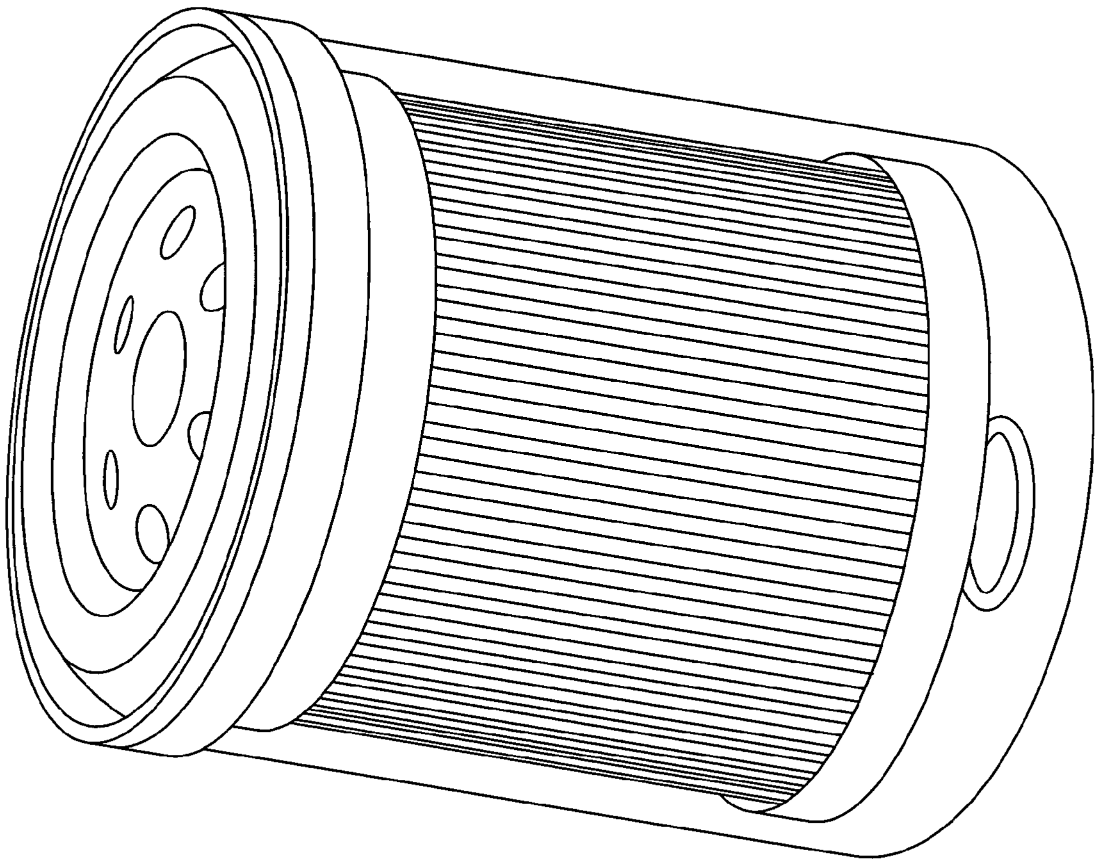
FIG. 4 is a perspective view of the assembled filter.

FIG. 2 discloses a detailed drawing of the housing assembly (4) connection with other filter components. The compressible seal (3) forms a fluid-tight seal between a structural plate (7) and the housing (1). The structural plate is disposed between the compressible seal (3) and an exterior cover plate (5). In the preferred embodiment, the structural plate (7) and the cover plate (5) are comprised of metal, preferably steel. The portion of the flange (2) embedded within the housing (1) has an "L" shape, and emerges from the housing (1) perpendicular to the housing's (1) cylindrical wall. The flange (2) extends from the housing (1) around the peripheral edge of the structural plate (7) to form a crimped double-seamed connection with the exterior cover plate (5). The double seamed connection assures the integrity of the sealed unit by placing the compressible seal (3) in compression, and placing the flange (2) in tension. An elastomeric gasket (6) forms a mating seal with the host engine or connecting component. In the preferred embodiment, the elastomeric gasket (6) is comprised of rubber, however, the gasket (6) may be comprised of plastic, foam, or another suitable elastomeric material. FIGS. 3 and 4 disclose the completed filter assembly.

In operation, the invention functions identically to traditional filters. Pressurized fluid flows into the filter through multiple radially spaced apertures at the base of the filter. The fluid then flows through the filter media and into a center tube, and is then circulated out of the filter through the threaded nipple and back to the engine or host connecting apparatus. However, unlike traditional metal filters, the invention allows the user to monitor the condition of the filter and fluid without interrupting the operating process.

For the foregoing reasons, it is clear that the invention provides an improved fluid filter device. In addition to its visual inspection advantages, the invention also has operational advantages. By injection molding the flange (2) directly into the wall of the transparent plastic housing (1), the invention overcomes the prior art's plastic-to-metal seal problems, and the resulting assembly (4) does not leak. The invention also has manufacturing advantages. By embedding the flange (2) into the wall of the housing, the plastic-to-metal seal-related assembly problems of the prior art are avoided, and the invention may be substituted directly into the traditional metal-housing assembly line without significant modification of the process. The ability to use existing machinery and processes to assemble the invention is an extremely significant advantage that allows the filter to be manufactured almost immediately, and avoids substantial re-tooling costs.

The invention may be used in automotive, transport, nautical, aeronautical, and medical applications, or in any process requiring fluid filtration. Although the materials of construction are generally described, they may also include a variety of compositions consistent with the function of the invention. For example, the structural plate (7), cover plate (10), or flange (2), may be comprised of any type of metal or rigid construction material consistent with the function of the invention. Similarly, components described as plastic may also be comprised of fiberglass, glass, epoxy composites, or other related materials. Such variations are not to be regarded as a departure from the spirit and scope of the invention, and all such modifications as would be obvious to one skilled in the art are intended to be included within the scope of the following claims.

I claim:

1. A filter assembly comprising:

a non-metal housing having an open end, a flange having a first end and a second end, said flange first end being embedded within a wall of said housing adjacent to said housing second open end, said flange second end extending from said housing open end, a cover plate connected to said second end of said flange, a compressible seal disposed adjacent said housing open end and said flange, said compressible seal being integrally formed with and comprised of the same material as said housing, and a structural plate disposed adjacent said flange, and said structural plate being disposed between said compressible seal and said cover plate.

2. The assembly as described in claim 1, wherein a fluid-tight seal is ensured by a secure connection between said cover plate and said second end of said flange, such that said compressible seal is placed in compression, and said flange is placed in tension.

3. The assembly as described in claim 2, wherein said secure connection between said cover plate and said second end of said flange is a double seamed connection.

4. The assembly as described in claim 3, wherein said non-metal housing is comprised of transparent plastic having a substantially cylindrical shape.

5. The assembly as described in claim 4 wherein said flange is embedded in the wall of said non-metal cylindrical housing during an injection molding process that forms said non-metal cylindrical housing.

6. The assembly as described in claim 5, wherein said structural plate, and said cover plate are comprised of metal.

7. The assembly as described in claim 6, wherein said flange is comprised of a malleable cylindrical metal ring.

8. The assembly as described in claim 7, wherein said structural plate, said cover plate, and said flange are comprised of steel.

9. The assembly as described in claim 8, wherein said flange extends from said housing around a peripheral edge of said compressible seal and said structural plate, and forms a double-seamed connection with said cover plate.

10. A filter assembly comprising:

a non-metal cylindrical housing having a closed and an open end;

a flange having a first and second end, said flange first end being permanently and non-detachably embedded within a wall of said housing adjacent said housing open end;

a compressible seal disposed adjacent said flange;

a cover plate connected to said flange; and a structural plate disposed within said compressible seal and between said cover plate and said open end of said housing, wherein said compressible seal engages said open end of said housing to provide a sealed connection between said open end of said housing and cover plate.

11. The assembly as described in claim 10, wherein said structural plate is disposed between the compressible seal and the cover plate.

12. The assembly as described in claim 10, further comprising an elastomeric gasket disposed adjacent said cover plate, said cover plate being disposed directly adjacent to said structural plate and said metal flange.

13. The assembly as described in claim 10, wherein a fluid-tight seal is ensured by a secure connection between said cover plate and said flange second end, such that said compressible seal is placed in compression, and said flange is placed in tension.

14. The assembly as described in claim 13, wherein said secure connection between said cover plate and said flange second end is a double seamed connection.

15. The assembly as described in claim 10, wherein said non-metal cylindrical housing is comprised of transparent plastic.

16. The assembly as described in claim 10, wherein said flange is embedded in the wall of said non-metal cylindrical housing during an injection molding process.

17. The assembly as described in claim 10, wherein said flange is comprised of a malleable cylindrical metal ring.

18. The assembly as described in claim 10, wherein said structural plate, said cover plate, and said flange are comprised of steel.

19. The assembly as described in claim 10, wherein said flange extends from said housing around the peripheral edge of said compressible seal and said structural plate, and forms a double-seamed connection with said cover plate.

20. The assembly as described in claim 10, wherein said flange second end is crimped to said cover plate to compress said compressible seal.

21. The assembly as described in claim 10, wherein said embedded portion of said flange first end has an L shape, said flange emerging from said housing perpendicular to said housing cylindrical wall.

22. A liquid filter apparatus comprising:

a transparent plastic cylindrical housing having a closed and an open end, a metal flange member having a first end permanently and non-detachably embedded within a wall of said housing adjacent said housing open end, a compressible seal integrally formed with said housing open end, said compressible seal disposed directly adjacent to said housing, said flange, and a structural plate, a metal cover plate disposed directly adjacent to said structural plate, said flange, and a rubber gasket, said cover plate forming a double seamed connection with said metal flange.

23. The assembly described in claim 1, further comprising a structural plate positioned within a circumference of said flange and disposed between said cover plate and said open end of said housing and held in place thereby.

24. A filter assembly comprising:

a non-metal housing having an open end, a flange having a first end and a second end, said flange first end connecting with a wall of said housing adjacent to said housing open end, said flange second end extending from said housing open end, a cover plate connected to said second end of said flange, a structural plate disposed between said cover plate and said housing, and a compressible seal disposed adjacent said housing open end and said flange, wherein said structural plate is disposed adjacent said flange, and said structural plate is disposed between said compressible seal and said cover plate.

25. The assembly as described in claim 24, wherein a fluid-tight seal is ensured by a said connection between said cover plate and said second end of said flange, such that said compressible seal is placed in compression, and said flange is placed in tension.

26. The assembly as described in claim 24, wherein said secure connection between said cover plate and said second end of said flange is a double seamed connection.

* * * * *